United States Patent [19]

Kuhnel et al.

[11] 4,435,466

[45] Mar. 6, 1984

[54] MULTI-LAYERED SEALING SHEET OF ELASTOMERIC SYNTHETIC RESIN

[75] Inventors: Werner Kuhnel, Neunkirchen-Schoneshof; Peter Pütz, St. Augustin-Menden; Manfred Simm, Troisdorf; Paul Spielau, Troisdorf-Eschmar, all of Fed. Rep. of Germany

[73] Assignee: Dynamit Nobel Aktiengesellschaft, Troisdorf, Fed. Rep. of Germany

[21] Appl. No.: 421,400

[22] Filed: Sep. 22, 1982

[30] Foreign Application Priority Data

Dec. 17, 1981 [DE] Fed. Rep. of Germany ....... 3150021

[51] Int. Cl.³ .................. B32B 5/08; B32B 17/04
[52] U.S. Cl. .................................... 428/215; 428/241; 428/247; 428/251; 428/252; 428/285; 428/286; 428/287; 428/515; 428/516; 428/517; 428/519; 428/521

[58] Field of Search ............. 428/247, 251, 252, 285, 428/286, 287, 515, 516, 517, 519, 521, 215, 241

[56] References Cited

U.S. PATENT DOCUMENTS 4,126,721 11/1978 Vitt ..................................... 428/247

Primary Examiner—Marion McCamish
Attorney, Agent, or Firm—Antonelli, Terry & Wands

[57] ABSTRACT

A multi-layered sealing sheet for the building industry is prepared so that all plies which contain elastomeric synthetic resins are devoid of vulcanization accelerator and consist of an elastomeric synthetic resin on the basis of ethylene-propylene-diene terpolymers and/or ethylene-propylene copolymers. A reinforcing insert is laminated in between the layers with the use of heat and is a fabric, a mat, a knitted material, or a similar material of synthetic resin fibers and/or glass fibers.

11 Claims, 1 Drawing Figure

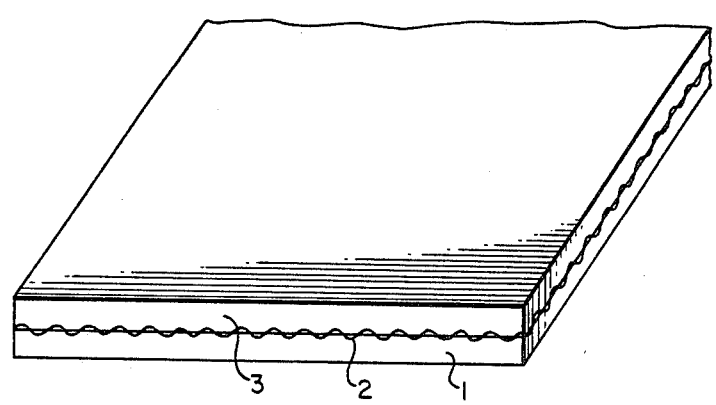

MULTI-LAYERED SEALING SHEET OF ELASTOMERIC SYNTHETIC RESIN

This invention relates to a multi-layered sealing sheet for the building industry with a textile reinforcing insert embedded between plies of elastomeric synthetic resins and optionally customary additives, the outer layers of this sealing sheet being weldable thermally and/or by use of solvents or swelling agents. Sealing sheets or films for the sealing of areas in above-ground, excavating, and civil engineering construction must exhibit a number of various properties to satisfy the posed requirements regarding leak-proofness and weatherability. Among these properties are high mechanical strength and adequate elongation at room temperature as well as higher temperatures up to about 80° C., long-term stability against weathering, light-fastness and UV stability, ready bondability of the sheets with one another to form larger-area tarpaulins, and aging resistance, as well as biological resistance. Sealing sheets of a great variety of compositions have been known, based on thermoplastic synthetic resins or elastomeric, vulcanizable or vulcanized synthetic resins, or thermoplastic synthetic resins having elastomeric properties, but these, besides advantageous properties, have in all cases disadvantages as well. The conventional thermoplastic sealing sheets, for example on the basis of plasticized polyvinyl chloride, polyisobutylene, acrylic polymers, or bitumen-modified thermoplastics can be tightly sealed along the seams in a simple and perfect fashion, but are sensitive to the effects of temperature. These drawbacks are sought to be counteracted by laminating woven fabrics or fleeces (mats) of textile fibers or glass fibers onto or into the sheets, but this method is only partially successful.

The conventional sealing sheets of vulcanizable synthetic resins, for example on the basis of chloroprene elastomer, ethylene-propylene-diene terpolymers, chloro-sulfonated polyethylene elastomer, or butyl elastomer, although meeting the requirements for mechanical strength and weatherability, exhibit the considerable drawback that the unvulcanized sheets do not satisfy the mechanical requirements at elevated temperatures and the vulcanized sealing sheets cannot be bonded together by heat or solvent/solution welding, but rather can be joined only with difficulties with the use of adhesives or adhesive strips or the like in a permanently tight fashion, see, for example, DOS (German Unexamined Laid-Open Application) No. 2,510,162 or DAS (German Published Application) No. 2,233,199.

In this connection, the sealing sheets based on thermoplastic synthetic resins with elastomeric properties occupy an intermediate position. In the sealing sheet, for example, according to DOS No. 2,621,825, the complete vulcanization is to take place only after laying at the building site and after establishing the seam bonds between the sealing sheets; however, there is the danger of premature completion of vulcanization, whereby then the simple production of welded seam bonds is, in turn, made impossible. In the sealing sheet according to DOS No. 2,219,147, in contrast thereto, an unvulcanized mixture of thermoplastic and elastomeric synthetic resins is utilized, but in this sheet the seam bonds can likewise be established only with the aid of additional adhesive strips.

Recently, the practice has been adopted of manufacturing also multi-layered sealing sheets of vulcanizable materials instead of the aforedescribed single-ply synthetic resin sealing sheets made up of one material and optionally provided with a reinforcing insert; in this case, the outer plies are not at all vulcanized, or are vulcanized only to such an extent that the layers can still be welded thermally and/or by means of solvents or solution welding agents, and at least one completely vulcanized ply is provided, see, for example, Austrian Patent No. 290,612 or DOS No. 2,628,741. However, one disadvantage herein is the dependency on the type and quantity of vulcanization accelerator employed as well as the instant of complete vulcanization.

The invention pursues the objective of providing a sealing sheet on the basis of elastomeric synthetic resins satisfying the above-posed requirements without exhibiting the disadvantages of the conventional sealing sheets. The invention starts with a sealing sheet for the building industry with at least two layers of elastomeric synthetic resins and optionally customary additives, constituting the outer plies or layers of the sealing sheet and being weldable thermally and/or by solvents or swelling agents. According to the invention, the objective is attained in the multi-layered sealing sheet by providing that all layers which contain elastomeric synthetic resins are free of vulcanization accelerator and consist of an elastomeric synthetic resin on the basis of ethylene-propylene-diene terpolymers and/or ethylene-propylene copolymers; and that the reinforcing insert laminated between the layers with the use of heat is a fabric, mat, knitted fabric, or similar fibrous material of synthetic resin fibers and/or glass fibers with a weight per unit area of 20–70 g/m$^2$, preferably 25–50 g/m$^2$ and with interstices in the fabric, mat, knitted fabric, or similar fibrous material between the warp threads and the weft threads of at least 2.0 mm, preferably above 3 mm of spacing; and the multi-layered sealing sheet, due to the penetration of the elastomeric synthetic resin through the interspaces of the fabric or the like has a parting strength of the layers of larger than 100 N/5 cm.

The sealing sheet of this invention with synthetic resins which, by the use of elastomers, are vulcanizable but have not been vulcanized, exhibits the advantageous properties of such synthetic resins, such as weldability, weathering and aging stability, inter alia, in the outer layers and attains, by a special reinforcing insert, not only a high parting strength of the layers, but besides dimensional stability, also adequate tear strength and tensile strength at higher temperatures to 80° C. and more. Since no vulcanization accelerators are used, there are no storage problems, either for the sealing sheets not as yet installed, namely the occurrence of an undesirable, gradual completion of vulcanization or curing.

The sealing sheet of this invention advantageously combines the benefits of the elastomeric, vulcanizable but not completely vulcanized synthetic resins, especially regarding weatherability, with the benefits of the thermoplastic synthetic resins, namely weldability, especially also solution weldability.

The multi-layered sealing sheet of this invention can be manufactured, for example, by calendering sheeting, especially in the thicknesses from 0.6 to 0.9 mm, in accordance with the individual layers, and rolling or laminating these sheets together with the use of heat and pressure, embedding the reinforcing insert therein. It is economical, in this connection, to employ the same sheeting material for each of the outer layers.

In composing the outer layers of the multi-layered sealing sheet, it can also be advantageous to indicate the location of the reinforcement within the sealing sheet by appropriate coloring or, for example, surface embossing of an outer ply, or to mark that outer layer which, as the weathering side, is treated with or enriched in special stabilizers and/or UV absorbers or similar auxiliary agents.

According to a further development of the invention, all of the layers or plies consist essentially of an elastomeric synthetic resin based on ethylene-propylene-diene terpolymers (EPDM) or ethylene-propylene copolymers (EPM) or mixtures of EPDM and EPM.

In an advantageous composition of the sealing sheet of this invention, the synthetic resin layers contain the following:

35–46% by weight of EPDM or EPM or mixtures of EPDM or EPM

40–58% by weight of fillers, of these up to 50% by weight of carbon black

5–12% by weight of extenders

10–0.1% by weight of stabilizers and antiaging compounds

5–1.9% by weight of mold release agents and auxiliary processing media.

The layers contain fillers, preferably:

19–22% by weight of carbon black, reinforcing or semireinforcing types

26–31% by weight of silicic acid anhydride or of silica (silicic acid anhydride and kaolinite with a particle size smaller than 20 μm and at least 40% proportion of smaller than 2 μm), based on 100% by weight of layer, for an economical manufacture of the sealing sheet, especially the carbon black is responsible for improving the strength, and as a processing aid. The composition according to this invention surprisingly provides good processability, especially suitability for calendering of the layers and satisfies the requirements demanded of a sealing sheet with regard to mechanical properties, etc.

The elastomeric synthetic resins selected are, in particular, partially crystalline ethylene-propylene terpolymers (EPDM) or partially crystalline ethylene-propylene copolymers (EPM) and/or mixtures thereof in order to ensure the high demands to be met by a sealing sheet with respect to mechanical properties, low-temperature stability, perforation strength even at higher temperatures, low shrinkage, tear strength, extensibility, and dimensional stability. An EPM is preferred with an ethylene content larger than 65% by weight and a propylene content smaller than 35% by weight, or an EPDM with an ethylene content larger than 65% by weight and a propylene content smaller than 30% by weight and maximally up to 8% by weight of a diene component, preferably less than 5% by weight of a diene component. A suitable diene component is, for example, ethylidene norbornene. Other diene useful for this invention are hexadiene and cyclopentadiene. The minimum degree of partial crystallinity of the EPDM or EPM employed is determined according to the DSC method in a differential scanning calorimeter measuring the melting curve. The maximum of the melting peak, measured at temperature TS in °C. according to the DSC curve is designated as an endothermal peak which can be very narrow (defined) but can also encompass a range. With ethylene-propylene terpolymers, the temperature TS is in the range around 50° C. The amount of heat required for melting, the so-called melting heat $\Delta H_s$, likewise measured according to the DSC method, then yields information on the presence of crystalline blocks in the ethylene-propylene terpolymer or ethylene-propylene copolymer. Those partially crystalline EPDM or EPM elastomers with a melting heat of at least 10 J/g are preferably employed according to this invention.

For selecting suitable elastomeric synthetic resins, especially EPDM and EPM, the strength thereof is likewise of importance, those EPDM and EPM being utilized according to the invention which exhibit a tear strength of at least 5 N/mm$^2$ measured according to DIN 53 455 (German Industrial Standard).

The high parting strength of at least 100 N/5 cm of the multi-layered sealing sheet of this invention is attained especially by choosing suitable reinforcing inserts with correspondingly large air interspaces between the warp and weft threads, making it possible for the synthetic resin layers to extend therethrough to an adequate degree and thereby to form an almost homogeneous bond. In this connection, glass fabrics are preferably employed, imparting to the sealing sheet a high dimensional stability and diminishing the shrinkage, much feared in the building industry, under alternating temperature stresses during the course of summer/winter weathering.

Likewise of decisive importance is the selection of suitable fillers for the synthetic resin layers and additives which cooperate synergistically and which improve the properties of the sealing sheet, especially its mechanical characteristics. In this connection, an essential component is constituted by semiactive or active carbon blacks, so-called reinforcing blacks, wherein the layers contain between 19 and 25% by weight, preferably 19–22% by weight of carbon blacks. For example, suitable are carbon blacks produced according to the furnace method exibiting average particle sizes of between 30 and 60 nm and a BET surface of between 30 and 60.

As reinforcing filler and simultaneously for making the product less expensive, silicic acid anhydride or silica is preferably employed, i.e., silica is a mixture of silicic acid anhydride and kaolinite, wherein the particle sizes should be smaller than 20 μm, and of these at least 40% should be smaller than 2 μm. However, it is also possible to replace up to ⅔ of the silica proportion by other fillers, likewise in a very fine-grained form, such as chalk, kaolin, talc, baryte silicic acid anhydride and/or glass fibers, or mixtures thereof.

Additionally, the layers of the sealing sheet contain stabilizers and antiaging agents, especially on the basis of sterically hindered phenolic antioxidants, phenolic phosphites, thioesters of aliphatic carboxylic acids, and similar materials. Especially suitable as mold release agents for processing are metallic soaps, for example calcium soaps, calcium stearate, zinc stearate, and as auxiliary processing agents especially montanic acid esters and/or hydrogenated hydrocarbon resins. Moreover, for processing EPDM and EPM, the use of extender oils on an aliphatic and/or naphthenic basis is required. A preferred structure for the synthetic resin layers according to the invention provides that they contain 35–46% by weight of EPDM and/or EPM, 31–26% by weight of fillers, such as chalk, kaolin, talc, baryte, silicic acid anhydride and/or glass fibers in mixtures with silica or solely silica or solely slicic acid anhydride 12–7% by weight of aliphatic and/or naphthenic extender oils, 1.0–0.1% by weight of stabilizers and antiaging agents on the basis of sterically hindered phenolic antioxidants, phenolic phosphites, thioesters of aliphatic carboxylic acids or the like, 25-19% by weight of reinforcing carbon blacks, 5.0-0.1% by weight of mold release agents on the basis of metallic soaps, 2.3-1.8% by weight of processing aids, such as montanic acid esters, hydrogenated hydrocarbon resins. Additionally, the sealing sheet can be provided with other customary additives, such as pigments for coloring and other materials.

The properties of the sealing sheet of this invention are excellently adapted to all demands to be met in the building industry. Besides showing high performance at room temperature, the sealing sheet performs at low temperatures of down to −60° C. as well as at high temperatures up to about 80° C. Weathering stability and biological resistance are likewise present. Moreover, however, ready workability is provided, and the possibility is afforded by producing tight seam bonds by means of the simple solution welding or hot-air welding method which is popular and has proven itself well in the construction field.

It is known that the elastomeric, non-crosslinked or not completely vulcanized or superficially vulcanized synthetic resins and elastomers can be very readily heatsealed by hot air or heated wedge and consequently good homogeneous seam bonds can be established. Such joining technique is desirable especially in the building industry when leakproof areas are produced with the use of sealing sheets, which must be bonded together into large sealing panels extending continuously over an area. Moreover, it is an object of the invention to provide a sealing sheet based on elastomeric synthetic resins which can also be bonded by the well-proven solution welding or cold welding method. The sealing sheet of this invention can be advantageously solution-welded with a solution welding agent on the basis of a mixture of toluene and petroleum spirits; in this process, it is possible to produce seam bonds of perfect quality at temperatures as low as above 0° C. in the open air at the building site.

Since the multi-layered sealing sheets of the invention must withstand, when used for the construction field, relatively long transport paths, and storage even at higher temperatures, for example in the summertime, it is important that the rolled-up sealing sheets do not stick together. For this purpose, it is proposed according to the invention to powder, for example, the outer layers with a thin layer of talc or the like to avoid blocking of the layers during transport and storage in this way. It is also possible to utilize a parting film on the basis of polyolefins, for example a very thin polypropylene film of 30-100 μm, inserted between the individual layers of the rolled-up multi-layered sealing sheet. However, in this connection the problem arises that when laying the multilayered sealing sheets at the building site, the parting film must be discarded as waste. The talc layer applied as the separating coat must be so thin that it does not impede the welding procedure, especially the solution welding process.

The sole FIGURE of the drawings shows a cross-sectional view of sealing sheets according to this invention.

The FIGURE shows a multi-layered sealing sheet with the two outer layers 1 and 3 based on EPDM and/or EPM without vulcanization accelerator and with the reinforcing insert 2, for example a glass fabric having a weight per unit area of 40 g/m². The thickness of the individual layers 1, 3 lies preferably between 0.6 and 0.9 mm, so that the sealing sheet has a total thickness of between about 1.2 and 1.8 mm. However, thicker plies are definitely likewise suitable in an individual application, wherein the single layers 1, 3 can also exhibit varying thicknesses.

The reinforcing insert can also terminate within the layers 1, 3, so that a marginal zone free of reinforcement remains. The outer plies 1, 3 can also be treated differently with auxiliary compounds, for example colorants, so that the top and bottom sides 1, 3 can be marked, providing a laying aid for the workman when installing the sealing sheet.

The following examples serve for explaining the invention without limiting same.

EXAMPLE 1

For obtaining the layer or multi-ply sealing sheet according to the drawing, sheets having a thickness of 0.75 mm made up of a material composition A according to Table I are utilized for the outer layers 1, 3; and a glass fabric with a weight per unit area of 30 g/m² with a nonslip finish on the basis of vinyl propionate dispersion is used for the reinforcing insert 2; these layers are combined into the sealing sheet by calendering.

TABLE I

| Composition | Parts by Weight |
|---|---|
| EPDM with | |
| 67% by weight ethylene | 40.0 |
| 27% by weight propylene | |
| 6% by weight ethylidene norbornene | |
| $\Delta H_s$ 14 J/g, | |
| Tear strength 11.2 N/mm² | |
| Sillitin (silica) | 27.0 |
| Extender oil (H90 of ESSO) | 8.0 |
| Hydrocarbon resin (ESSO, ESCOREZ 5300) | 2.0 |
| Carbon black, semiactive | 22.5 |
| Calcium soap (CEASIT 1) | 0.3 |
| Antioxidants (JRGANOX 1010) | 0.2 |

The thus-produced multiple-layer sealing sheet has the following properties:

| | |
|---|---|
| Thickness | DIN 53370 1.5 mm |
| Tear strength | DIN 53354 longitudinal/transverse, fabric >400/>400 N/5 cm |
| Tear strength | DIN 53354 longitudinal/transverse, sheet >450/>450 N/5 cm |
| Elongation at rupture | DIN 53354 longitudinal/transverse, fabric 2/2% |
| Elongation at rupture | DIN 53354 longitudinal/transverse, sheet >450/>450% |
| Specific gravity | DIN 53479 1270 kg/m³ |
| Parting strength of layers | DIN 53357 >100 N/5 cm |
| Dimensional change at +80° C., 6 hour period | DIN 53377 <0.5% |
| Cold impact strength | VDCH 22-02 218 K |

To weld the sealing sheets together with one another, the solution welding agent employed is, for example, a mixture of 1 part by volume of toluene and 3 parts by volume of petroleum spirits with a boiling range from 100° to 140° C. Welding together of the sealing sheet of this invention with the aid of the solution welding agent heretofore described can be carried out at temperatures starting with 0° C. on upward, preferably at above 15° C.

In the process for the production of the multi-layered sealing sheet of this invention, a sheet having preferably a thickness of between 0.6 and 0.9 mm is calendered, in a first process step, from the elastomeric synthetic resin based on ethylene-propylene-diene terpolymers and/or ethylene-propylene copolymers. In this procedure, a premix of carbon black and EPDM or EPM, or alternatively of EPDM plus EPM, is first of all produced, and this premix is then combined with the other additives, such as fillers, stabilizers, mold release agents, extenders, etc. The preparation of a premix of carbon black and elastomeric synthetic resin improves the mechanical properties of the resultant sheet. The mixing step is conducted either continuously in a screw-type masticator or, for example, discontinuously in an internal masticator, e.g., a floating weight internal masticator. The mixture is made to melt in the mixer at temperatures of 130–200° C. The mixer yields a doughy, plasticized, not yet entirely homogenized mass which is then fed to a rough rolling mill for further intermixing and is further worked in this mill at temperatures of between 170° and 185° C. Subsequently, the batch is fed to a strainer, for example, and is here subjected to a final homogenizing step and filtered. When exiting from the strainer, the mass has a temperature of about 200° C. The thus-prepared batch can now be introduced into the actual calender; in this connection, L calenders as well as inverted-L calenders can be utilized. When the batch is fed to the roll nip of the calender, it has a temperature of between about 185° and 190° C. and when leaving the last calender roll, it approximately still has a temperature of 170° C. The aforedescribed mode of operation is required to obtain a homogeneous, bubble-free product and is specifically adapted to the mixtures and molding compositions employed according to this invention for the production of the sealing sheets. Take-off speeds, i.e., production rates at the calender of between 10 and 20 m/min are possible for the materials used in accordance with the invention and for the selected sheet thicknesses. Since the elastomeric mixtures employed tend to be extremely tacky, inasmuch as they soften above 100° C. and lose their mechanical strength, the preparation of the premix of carbon black and EPDM in particular is an essential step toward improving calendering ability.

Furthermore, a doubling or laminating system is required for the production of the multi-layered sheet. In this process, two calendered sheets of the same thickness, e.g., 0.75 mm, or of differing thicknesses, such as 0.5 and 0.8 mm, are conducted from two sides in preheated condition, for example by guiding over heating rolls of a temperature of 100°–125° C. and/or are superficially heated by heat-radiating units on the side to be bonded to the glass fabric. The surface heating ranges approximately between 90° and 120° C. for the calendered sheets. Thereafter, both sheets are combined in a roll nip constituted by two laminating rolls, the glass fabric entering in the middle. However, it is also possible to join the glass fabric preliminarily with only one sheet first of all, and thereafter to add the second sheet by laminating. In the laminating nip, a pressure prevails of 3–5 bar. After lamination, the thus-produced multi-layered sheet runs optionally subsequently through a so-called embossing station wherein likewise again a pressure of 3–6 bar is applied in the roll nip. Then the multi-layered sheet is taken off, cooled, optionally powdered on its surface to prevent blocking, and rolled up.

It is also possible, for example, to fashion one of the two laminating rolls as an embossing roller, so that a separate embossing station can be omitted.

What is claimed is:

1. A multi-layered sealing sheet for the building industry which comprises a textile reinforcing insert embedded between layers of elastomeric synthetic resin containing additives to enhance the weatherability and fillers to enhance the mechanical properties of said sealing sheet, the outer layers of said sealing sheet being weldable thermally and/or by use of solvents or swelling agents, all layers which contain elastomeric synthetic resin being free of vulcanization accelerator and containing synthetic resin consisting essentially of an ethylene-propylene-diene terpolymer and/or ethylene-propylene copolymer, and the reinforcing insert embedded in between the layers with the use of heat being a fabric, mat, knitted fabric, or similar textile material formed of synthetic resin fibers and/or glass fibers with a weight per unit area of 20–70 $g/m^2$ and with interstices having a spacing of at least 2.0 mm through which the elastomeric synthetic resin penetrates; said multilayered sealing sheet, due to the penetration of the elastomeric synthetic resin through the interspaces of the reinforcing insert, exhibiting a parting force of the layers which is larger than 100 N/5 cm.

2. A sealing sheet according to claim 1, wherein the layers of synthetic resin each contain
   35–46% by weight of ethylene-propylene-diene terpolymer or ethylene-propylene copolymer or mixtures of ethylene-propylene diene terpolymer and ethylene propylene copolymer
   40–58% by weight of fillers, of these up to 50% by weight carbon black
   5–12% by weight of extenders or similar materials
   1.0–0.1% by weight of stabilizers and antiaging agents
   5–1.9% by weight of mold release agents and processing aids.

3. A sealing sheet according to claim 1 or claim 2, wherein each layer contains as the fillers
   19–22% by weight of carbon black and
   26–31% by weight of silicic acid anhydride or of silica (silicic acid anhydride and kaolinite with a particle size smaller than 20 $\mu m$ and with at least 40% being smaller than 2$\mu m$),
based on 100% by weight of layer.

4. A sealing sheet according to claim 1, wherein the layers each contain
   35–46% by weight of ethylene-propylene-diene terpolymer and/or ethylene propylene copolymer
   31–26% by weight of fillers comprising chalk, kaolin, talc, baryte, silicic acid anhydride and/or glass fibers in mixtures with silica, or only silica,
   12–7% by weight of aliphatic and/or naphthenic extender oils,
   1.0–0.1% by weight of stabilizers and antiaging compounds, including sterically hindered phenolic antioxidants, phenolic phospites, and thioesters of aliphatic carboxylic acids,
   25–19% by weight of reinforcing carbon black types,
   2.0–0.1% by weight of mold release agents including metallic soaps,
   2.3–1.8% by weight of processing aids including montanic acid esters and/or hydrogenated hydrocarbon resins.

5. A sealing sheet according to claim 1, wherein said synthetic resin consists essentially of an ethylene-propylene copolymer of 65% by weight of ethylene and 35% by weight of propylene or an ethylene-propylene-diene terpolymer of 65% by weight of ethylene, 30% by weight of propylene, and up to maximally 8% by weight of a diene component.

6. A sealing sheet according to claim 1, wherein the ethylene-propylene-diene terpolymer contains ethylidene norbornene as the diene component.

7. A sealing sheet according to claim 1, wherein the ethylene-propylene-diene terpolymer or ethylene-propylene copolymer and/or mixtures thereof used are partially crystalline and exhibit a melting heat in accordance with DSC of at least $\Delta H_s = 10 J/g$.

8. A sealing sheet according to claim 1, wherein an ethylene-propylene-diene terpolymer or ethylene-propylene copolymer is utilized which exhibits a tear strength of at least $5N/mm^2$.

9. A sealing sheet according to claim 1, wherein two calendered layers of elastomeric synthetic resins having a thickness of 0.6–0.9 mm are laminated under pressure and heat to the reinforcing insert.

10. A sealing sheet according to claim 9, wherein the outer layers are powdered with a thin talc coat or the like, so that the transportable, rolled-up sealing sheet does not block.

11. A sealing sheet according to claim 1, wherein the ethylene-propylene terpolymer contains hexadiene as the diene component.

* * * * *